UNITED STATES PATENT OFFICE.

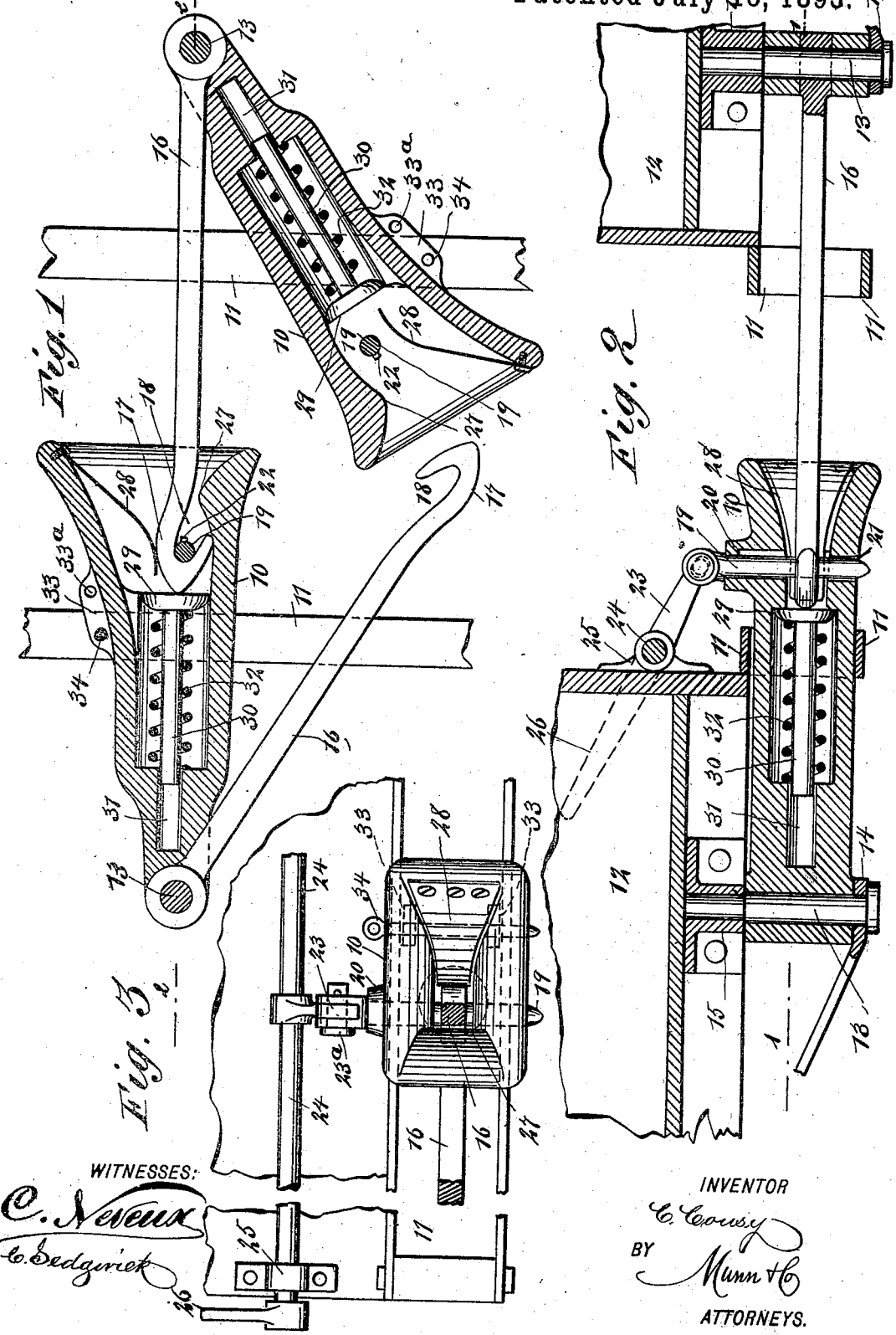

CONSTANT COUSY, OF NEW YORK, N. Y.

CAR-COUPLING.

SPECIFICATION forming part of Letters Patent No. 501,871, dated July 18, 1893.

Application filed November 12, 1892. Serial No. 451,780. (No model.)

*To all whom it may concern:*

Be it known that I, CONSTANT COUSY, of New York city, in the county and State of New York, have invented a new and Improved Car-5 Coupling, of which the following is a full, clear, and exact description.

My invention relates to improvements in car couplings, and the object of my invention is to produce a simple and durable coupling, by means of which cars may be automatically coupled together, to construct the coupling so that it will not accidentally uncouple, to adapt it to movements around a curve, to arrange the parts so that it may be easily uncoupled from the side or top of a car without danger to the brakeman, and in general, to produce a coupling which combines to the greatest extent the qualities of cheapness, durability and efficiency.

To this end, my invention consists in certain features of construction and combinations of parts, which will be hereinafter described and claimed.

Reference is to be had to the accompanying drawings forming a part of this specification, in which similar figures of reference indicate corresponding parts in all the views.

Figure 1 is a sectional plan of two connected couplings embodying my invention, on the line 1—1 in Fig. 2. Fig. 2 is a vertical longitudinal section on the line 2—2 in Fig. 1; and Fig. 3 is a broken end view, with parts in section.

The coupling is provided with a drawhead 10, very similar in shape to the ordinary drawhead, being hollow and having a bell-shaped mouth, and this is supported in a suitable framework 11 on the under side of a car 12. The drawhead at its rear end is pivoted so as to swing horizontally on a pin 13 which is held in suitable supports 14 and 15. Extending forward from the pivot pin 13, and forming a part of the coupling, is a drawbar 16, which extends outward at an angle to the drawhead, and the drawbar terminates at its free end in a hook 17, which is preferably widest at its mouth 18, thus giving to it a somewhat wedge-shape which enables it to easily enter the drawhead of an opposing coupling. The hook 17 is adapted to engage a coupling pin 19 of an opposing coupling, and the coupling pin is arranged vertically in the drawhead, near its front end, the pin being held to slide in a boss 20 on the top of the drawhead, and in a hole 21 in the bottom of the drawhead. Near the lower end of the pin is a laterally-extending stud 22, which prevents the entire removal of the pin, but permits it to be raised sufficiently to allow the withdrawal of a drawbar. The pin 19, at its upper end, may be pivoted to the front end of a crank arm 23, by a detachable pin 23ª. The arm 23 is secured to a shaft 24, which is journaled in bearings 25 on the front end of the car, and provided at one end with a handle or crank 26, by which it may be turned. It will be seen that by turning the shaft 24, the arm 23 and pin 19 may be raised.

In the mouth of the drawhead and on one side, is an inwardly-projecting boss 27, which serves to throw the hook 17 to the opposite side of the drawhead when the hook is pushed, and on the side of the drawhead opposite the boss, is an inwardly-extending spring 28, which is firmly secured to the drawhead and which is adapted to press the hook 17 of the drawbar into engagement with the pin 19. The hook is pressed forward into engagement with said pin by a spring plate 29, which is arranged to move horizontally in the drawhead behind the pin, and this plate has a rearwardly-extending shank 30, which slides in a guide bore 31, and coiled around the shank is a spiral spring 32, which presses the plate 29 forward. On one side of the drawhead is a web 33, having holes 33ª therein, which are adapted to receive the vertical pin 34, and by inserting the pin in the holes and in corresponding holes in the framework which supports the drawhead, the latter may be held in a desired position.

When the drawhead is to be used it extends straight forward from the center of the car and the drawbar 16 extends outward and forward at an angle to the drawhead, and when the drawbar is to be used it is held in alignment with the center of the car, and the drawhead is swung to one side. The pin 34 prevents the shifting of the drawhead when it is once placed in position.

The coupling operates as follows: The drawhead 10 of one car is made to align with the drawbar of an opposing car, and when the cars come together, the hook 17 of the drawbar enters the mouth of the drawhead, and is guided by the boss 27 so as to pass inward on the proper side of the pin 19. As it extends inward and passes the pin, the spring 28 throws it over against the pin so as to prevent its withdrawal, and the spring plate 29 is held against the hook so as to take up the lost motion. When the cars are to be uncoupled, the shaft 24 is turned so as to lift the arm 23 and pin 19, after which the cars may be pulled apart.

Having thus described my invention, I claim as new and desire to secure by Letters Patent—

1. A car coupling, comprising a horizontally-swinging drawhead pivoted to a car and having a vertically movable pin therein, and a horizontally-swinging drawbar secured to the drawhead and extending forward at an angle to the same, the front end of the drawbar terminating in a hook, substantially as described.

2. A car coupling, comprising a diverging drawhead and drawbar pivoted on a common pivot so as to swing horizontally beneath a car, the drawhead having a vertically movable coupling pin and an inwardly-extending spring arranged at one side of the pin, and the drawbar having a hook at its front end to engage the pin of an opposing coupling, substantially as described.

3. In a car coupling, the horizontally-swinging drawbar having a bell-shaped mouth, a vertically moving coupling pin, an inwardly-extending boss on one side of the mouth, and an inwardly-extending spring on the opposite side of the mouth and opposite the pin, substantially as described.

4. In a car coupling, the drawbar held to swing horizontally beneath a car and having a bell-shaped mouth, a boss in one side of the mouth, a spring in the opposite side of the mouth, a vertically-movable pin arranged opposite the spring, and a spring-pressed plate arranged behind the pin, substantially as described.

CONSTANT COUSY.

Witnesses:
WARREN B. HUTCHINSON,
EDGAR TATE.